United States Patent
Wang

(10) Patent No.: US 8,432,081 B2
(45) Date of Patent: Apr. 30, 2013

(54) DIRECT ROTATION-INDUCING GENERATOR

(76) Inventor: Yuanchang Wang, Shandong (CN)

(*) Notice: Subject to any disclaimer, the term of this patent is extended or adjusted under 35 U.S.C. 154(b) by 253 days.

(21) Appl. No.: 13/001,783

(22) PCT Filed: Sep. 6, 2010

(86) PCT No.: PCT/CN2010/001353
§ 371 (c)(1),
(2), (4) Date: Dec. 28, 2010

(87) PCT Pub. No.: WO2011/057466
PCT Pub. Date: May 19, 2011

(65) Prior Publication Data
US 2011/0175477 A1 Jul. 21, 2011

(30) Foreign Application Priority Data
Nov. 10, 2009 (CN) .......................... 2009 1 0230318

(51) Int. Cl.
*H02K 1/06* (2006.01)
(52) U.S. Cl.
USPC ............................. 310/181; 310/266; 310/268
(58) Field of Classification Search ............. 310/156.32, 310/156.36, 156.37, 181, 266, 268, 112–114
See application file for complete search history.

(56) References Cited

U.S. PATENT DOCUMENTS

| 3,927,329 | A | * | 12/1975 | Fawcett et al. | 290/1 R |
| 6,734,574 | B2 | * | 5/2004 | Shin | 290/1 R |
| 6,982,501 | B1 | * | 1/2006 | Kotha et al. | 310/11 |
| 7,081,683 | B2 | * | 7/2006 | Ariav | 290/1 R |

FOREIGN PATENT DOCUMENTS

| JP | 57199439 A | * | 12/1982 |
| JP | 2002034214 A | * | 1/2002 |
| WO | PCT/CN2010/001353 | | 12/2010 |

* cited by examiner

*Primary Examiner* — Hanh Nguyen
*Assistant Examiner* — Naishadh Desai
(74) *Attorney, Agent, or Firm* — Global IP Services; Tianhua Gu

(57) ABSTRACT

The invention discloses a direct rotation-inducing generator, which comprises an iron core bracket, and a rotating shaft is arranged on the iron core bracket. A first rotary disc and a second rotary disc are respectively arranged on both ends of the rotating shaft. A first iron core is arranged on the iron core bracket and a first coil is arranged on the periphery of the iron core bracket. A first sealing plate is arranged on the first rotating disc, a first magnet is arranged on the first rotary disc or the first sealing plate, and the surface of the first magnet and the first sealing plate share a same surface. A fourth magnet is arranged on the second rotary disc, the first magnet and the fourth magnet correspond with the two ends of the first iron core, and the first magnet faces the fourth magnet by the opposite poles. One end of the first iron core is provided with a liquid storage tank, which is filled with magnetic liquid, and the end filled with magnetic liquid in the first iron core contacts with the first sealing plate. The main magnetic flux of the direct rotation-inducing generator and the magnetic flux generated by induced current are both horizontal with the iron core within the iron core, which significantly reduce the resistance effect on the relative rotation of the iron core and the magnets, thus saving the energy for power generation.

10 Claims, 3 Drawing Sheets

DIRECT ROTATION-INDUCING GENERATOR

CROSS REFERENCE TO RELATED PATENT APPLICATION

Figure 1:
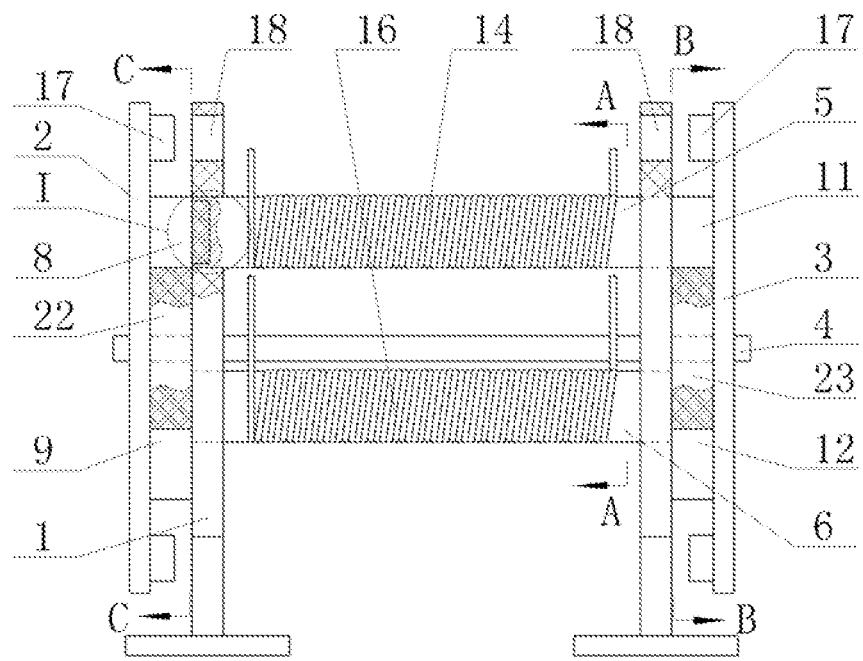

This patent application is the US national stage of PCT/CN2010/001353 filed on Sep. 6, 2010, which claims the priority of the Chinese patent application No. 200910230318.8 filed on Nov. 10, 2009 that application is incorporated herein by reference.

FIELD OF THE INVENTION

The invention relates to a generation device, in particular to a direct rotation-inducing generator.

BACKGROUND OF THE INVENTION

The traditional generator has the following defects: first, when the rotor (the poles) and the stator (the coil) of traditional generators are in relative circular motion, the magnetic force lines and the coil are in relative cutting motion, the main magnetic flux and the rotational magnetic field generated by the induced current of the coil form a tangential force which is in the opposite direction of the rotor rotation direction, thus having resistance effect on the rotor.

The input power is much larger than the electromagnetic resistance to meet the operation requirement of generator. The higher the electromagnetic resistance is, the more energy is consumed. This generation mode only completes part of the energy conversion, the conversion efficiency is low, and the energy consumption is high. Second, magnetisms leakage and harmonic waves can occur to the iron core of traditional generators, which is harmful to the grid.

In addition, reducing the space between the iron core and the poles is a must to increase the generation efficiency of generators in that the smaller the space is, the smaller magnetic resistance generated by the air in the space is, and the higher the generation efficiency is. The optimized scheme is that the iron core is in direct contact with the poles so as to ensure most magnetic force lines of the poles to pass through the iron core.

However, on the one hand, the requirements on processing techniques is high and the production cost of generators is significantly increased for reducing the space between the iron core and the pole; on the other hand, since the existing iron core and the pole are solid, the generation efficiency of generators is difficult to be optimized if the frictional force from direct contact is too large.

SUMMARY OF INVENTION

The purpose of the invention is to provide a direct rotation-inducing generator, which generates induced electromotive force in the coil by changing the magnetic flux in the iron core of generators instead of cutting the magnetic force lines in the coil.

The magnetic force lines are vertical to the coil of the iron core as well as to the relative rotation direction of the iron core and the magnet. Therefore, the main magnetic flux of the direct rotation-inducing generator and the magnetic flux generated by induced current are both in parallel direction with the iron core within the iron core, which significantly reduce the resistance effect on the relative rotation of the iron core and the magnet, thus saving the energy for power generation. The magnetisms leakage and harmonic waves are unlikely to occur in the iron core, thus doing no harm to the grid and further resolving the defects of the existing generator.

In addition, the magnetic resistance between the pole and the iron core can be eliminated, thus effectively increasing the generation efficiency of generators.

The purpose of the invention is realized by the following technical scheme: the generator comprises an iron core bracket and a rotating shaft mounted on the iron core bracket. A first rotary disc and a second rotary disc are arranged on both ends of the rotating shaft. A first iron core is arranged on the iron core bracket, and a first coil is arranged on the periphery of the first iron core. A first sealing plate is arranged on the first rotary disc, a first magnet is arranged on the first rotary disc or the first sealing plate, and the first magnet and the first sealing plate share a same surface.

A fourth magnet is arranged on the second rotary disc, the first magnet and the fourth magnet correspond to the two ends of the first iron core, and the first magnet faces the fourth magnet by the opposite poles. A liquid storage tank which is filled with magnetic solutions is arranged on an end of the first iron core, and the end filled with magnetic liquid in the first iron core contacts with the first sealing plate.

In order to further realize the purpose of the invention, the following technical scheme is also adopted: a second iron core and a third iron core are arranged on the iron core bracket. The first iron ore, the second iron core and the third iron core are equally distributed on the periphery of the rotating shaft. The first iron ore, the second iron core and the third iron core share a same circle center. A second coil is arranged on the periphery of the second iron core and a third coil is arranged on the periphery of the third iron core.

A second magnet is arranged on the first rotary disc and has the same distance with the first magnet as with the rotating shaft. The second magnet and the first magnet are in an angle of 180 degrees.

A fifth magnet is arranged on the second rotary disc and has the same distance with the fourth magnet as with the rotating shaft. The fifth magnet and the fourth magnet are in an angle of 180 degrees. The fifth magnet faces the second magnet by opposite poles. The surface of the fifth magnet and a second sealing plate share a same surface, and the surface of the second magnet and the first sealing plate also share a same surface. The shapes and sizes of the end surfaces of the first iron ore, the second iron core, the third iron core, the first magnet, the second magnet, the fourth magnet and the fifth magnet are identical. The pole direction of the first magnet and that of the second magnet are opposite. The pole direction of the first magnet and that of the second magnet are identical.

A plurality of external magnetic blocks are arranged on the first rotary disc and equally distributed on the periphery taking the rotary shaft as the circle center. A plurality of internal magnetic blocks are arranged on the iron core bracket and equally distributed on the periphery taking the rotary shaft as the circle center. The vertical distance between the external magnetic blocks and the rotary shaft is the same as that between the internal magnetic blocks and the rotary shaft. The internal magnetic blocks correspond with the external magnetic blocks respectively, and the poles with the same polarity face with each other. A plurality of external magnetic blocks are arranged on the second rotary disc and are equally distributed on the periphery taking the rotary shaft as circle center. A plurality of internal magnetic blocks are arranged on the iron core bracket and equally distributed on the periphery taking the rotary shaft as circle center. The vertical distance between the external magnetic blocks and the rotary shaft is the same as that between the internal magnetic blocks and the rotary shaft.

The internal magnetic blocks correspond with the external magnetic blocks respectively, and the poles with the same polarity face with each other. The first sealing plate is a ring structure. A liquid storage tank which is filled with magnetic liquid is arranged on both ends of the first iron core. The second sealing plate is arranged on the second rotary disc. The fourth magnet and the second sealing plate share a same surface. The two ends of the first iron core respectively contact with the first sealing plate and the second sealing plate. The second sealing plate is also a ring structure.

The positive effect of the invention is that the direct rotation-inducing generator generates induced electromotive force in the coil by changing the magnetic flux in the iron core of generators. The intensity of generated induced current is related to the change rate of the magnetic flux and the electric resistance of the wire load.

When the generator is working, to be more specific, during the relative rotation process of the iron core and the magnet, the magnetic force lines of the magnet is always vertical to the end surface of the iron core, that is, the rotation direction changing the magnetic flux of the iron core is always in 90 degrees with the direction of the magnetic force lines of the magnet. This structure can significantly reduce the rotation resistance between the stator and the rotor of the generator, increase the generation efficiency, and have good energy conservation effect. The generator device produces no magnetism leakage or harmonic wave, reduces certain resistance, save energy, and does no harm to grids. The magnetic liquids are filled in both ends of the iron core, which enables that most parts between the poles and the core is in contact by solid and liquid, thus eliminating the magnetic resistance between the iron core and the pole, increasing generation efficiency, reducing the friction force between the iron core and the poles to the maximum, and lowering the energy consumption for electricity generation. The iron core bracket provides sufficient support for the iron core, which may effectively prevent the swinging of the iron core under external force, avoid unnecessary friction force, and prolong the service life of the motor. The rotary disc with poles has the advantages of small size, light weight, slight processing difficulty and small pole mounting difficulty. In addition, the direct rotation-inducing generator also has the advantages of long service life, small processing difficulty, simple and compact structure, low production cost as well as safe and convenient use.

DESCRIPTION OF ATTACHED FIGURES

Figure 2:
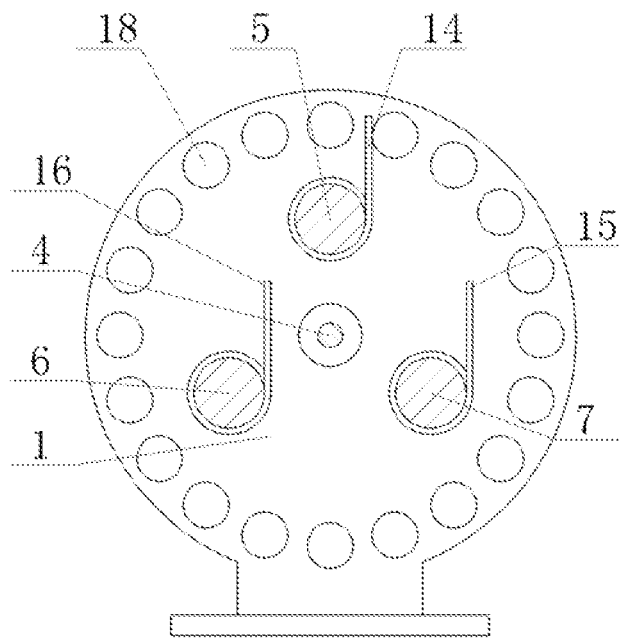
Figure 3:
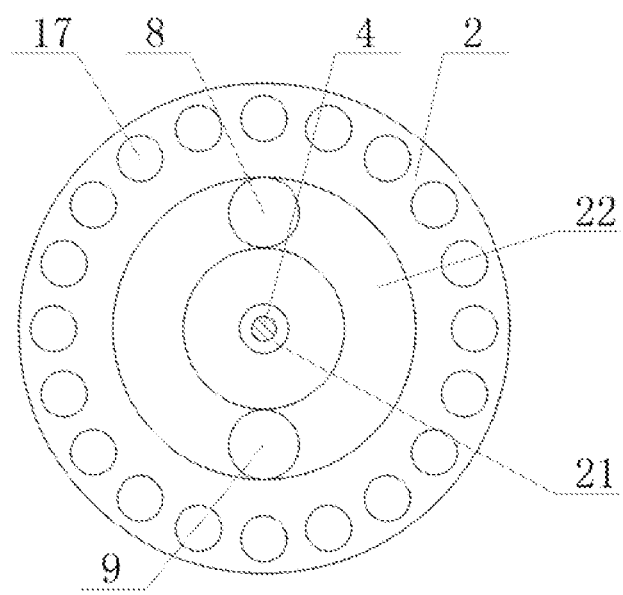
Figure 4:
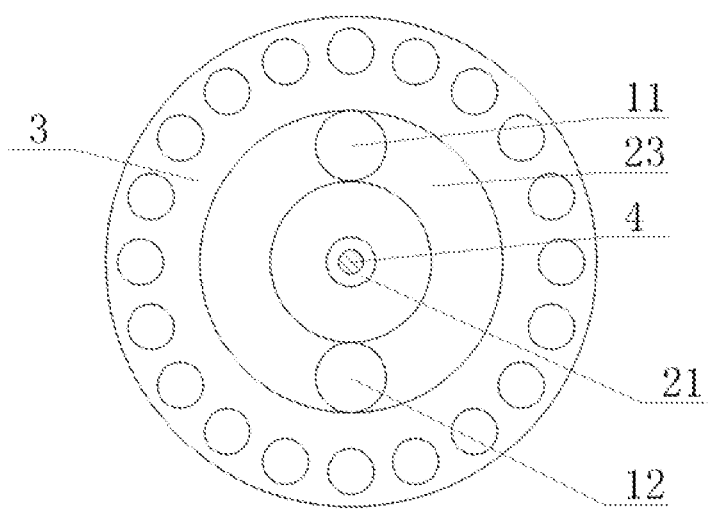
Figure 5:
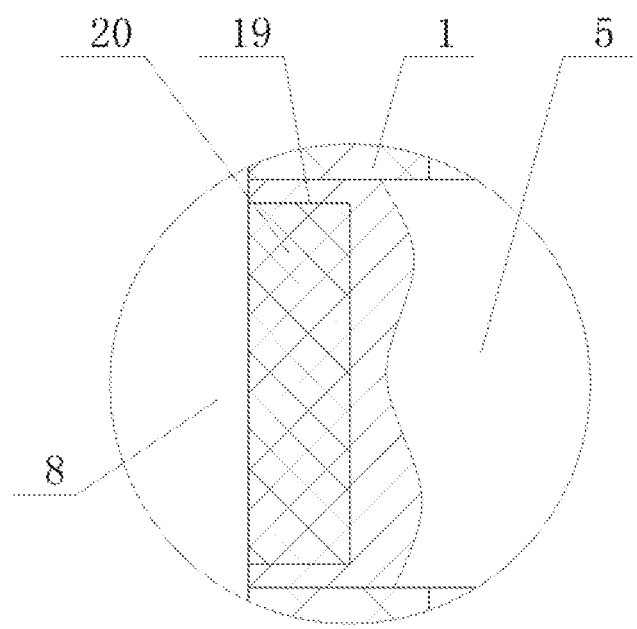

FIG. 1 is a structure diagram of the invention;
FIG. 2 is the A-A sectional-view structure diagram of FIG. 1;
FIG. 3 is the C-C sectional-view structure diagram of FIG. 1;
FIG. 4 is the B-B sectional-view structure diagram of FIG. 1; and
FIG. 5 is the I local enlarged structure diagram of FIG. 1.

Numbers in the Figure: 1. iron core bracket; 2. first rotary disc; 3. second rotary disc; 4. rotating shaft; 5. first iron core; 6. second iron core; 7. third iron core; 8. first magnet; 9. second magnet; 11. fourth magnet; 12. fifth magnet; 14. first coil; 15. third coil; 16. second coil; 17. external magnetic block; 18. internal magnetic block; 19. liquid storage tank; 20. magnetic liquid; 21. bearing; 22. first sealing plate; 23. second sealing plate.

DETAILED DESCRIPTION OF THE INVENTION

The direct rotation-inducing generator comprises an iron core bracket 1 and a rotating shaft 4 mounted on the iron core bracket 1. A first rotary disc 2 and a second rotary disc 3 are mounted on both ends of the rotating shaft 4.

A first iron core 5 is mounted on the iron core bracket 1, a first coil 14 is arranged on the periphery of the first iron core 5. A first sealing plate 22 is arranged on the first rotary disc 2, a first magnet 8 is arranged on the first rotary disc 2 or the first sealing plate 22, and the surface of the first magnet 8 and the first sealing plate 22 share a same surface.

A second sealing plate 23 is arranged on the second rotary disc 3, and the second rotary disc 3 or the second sealing plate 23 is provided with the fourth magnet 11 which shares the same surface with the surface of the second sealing plate 23.

The first magnet 8 and the fourth magnet 11 correspond to the two ends of the first iron core 5, and the first magnet 8 faces the fourth magnet 11 by the opposite poles, thus ensuring that magnetic force lines of the first magnet 8 faces the fourth magnet 11 can pass through the first iron core 5 during the rotation process of the first rotary disc 2 and the second rotary disc 3.

A liquid storage tank 19 which is filled with magnetic liquids 20 is arranged on both ends of the first iron core 5 respectively, and both ends of the first iron core 5 respectively contact with the first sealing plate 22 and the second sealing plate 23. The two ends of filled with magnetic liquid 20 of the iron core can reduce the contact surface of the solid parts of the iron core and the magnet, so that most parts between the iron core and the magnet are in solid and liquid contact, and effectively reduce the friction force between the iron core and the magnet.

The magnetic liquid 20 has relatively good magnetic conductivity, and the direct contact of the poles can eliminate the magnetic resistance between the poles and the iron core to the maximum and increase the generation efficiency.

Since the magnetic liquid 20 is filled in both ends of the iron core, in order to prevent the loss of magnetic liquid 20 from the liquid storage tank 19, the first sealing plate 22 is mounted on the first rotary disc 2, and the second sealing plate 23 is mounted on the second rotary disc 3, thus ensuring that the liquid storage tank 19 is always in a sealed state during the rotation process. In order to reduce production cost, the liquid storage tank which is filled with the magnetic liquid 20 is also arranged on only one end of the first iron core. The second sealing plate 23 needs not to be mounted on the second rotary disc 3, and the fourth magnet 11 is directly mounted on the second rotary disc 3. However, the elimination effect of magnetic resistance between the iron core and the poles is not satisfactory.

The liquid storage tank 19 can be directly provided on both ends of the iron cores such as the first iron core 5, and can also be formed by connecting the ring parts made of materials such copper or aluminum and both ends of the first iron core 5. In other words, the liquid groove 19 is enclosed by materials such as copper or aluminum.

The first rotary disc 2 and the second rotary disc 3 are the carriers of the first magnet 8 and the fourth magnet 11 which are mounted as poles. The first rotary disc 2 and the second rotary disc 3 can drive the magnet to rotate against the iron cores such as the first iron core 5.

The iron core bracket 1 is the part to fix the first iron core 5 so as to prevent, to the maximum, the swinging of the first iron core 5 due to interruption of external force when working.

Other structural schemes are also available to realize the function of relative rotation of the pole to the iron core. For example, in the fixed shaft rotation cylinder mechanism, a fixed shaft replaces the iron core bracket 1, a supporting rod is arranged on the fixed shaft, and the iron cores such as the first iron core 5 is fixed by the supporting rod.

The rotary cylinder is arranged on the periphery of the fixed shaft and rotates against the fixed shaft, that is, fixed poles are arranged on the inner sides of both ends of the rotary cylinder instead of the first rotary disc 2 and the second rotary disc 3, and the magnetic poles are located inside both ends of the rotary cylinder. The generator with the fixed shaft rotary cylinder mechanism can realize the relative rotation of the poles, yet the following defects exist: first, on the premise of same materials and weight, when the fixed shaft with supporting rods and the iron core bracket 1 are manufactured respectively, the intensity of the fixed shaft with supporting rods is much lower than that of the iron core bracket 1.

In the production, the fixed shaft with supporting rods is absolutely unable to provide enough support to iron cores such as the first iron core 5; yet in working process of generators, the external force borne by the iron cores such as the first iron core 5 can be changed periodically and the strength is large.

The swinging of iron cores such as the first iron core 5 which is ineffectively supported and fixed can directly affect the efficiency of generators and result in unnecessary friction, thus significantly shortening the service life of generators. Compared with the fixed shaft with supporting rods, the iron core bracket 1 can provide sufficient support for the first iron core 5, thus effectively preventing the swinging of the first iron core 5 under external force, avoiding unnecessary friction, and prolonging the service life of motors. Second, the volume of the rotary cylinder is much bigger than the volume sum of the first rotary disc 2 and the second rotary disc 3, which increases the energy consumed for driving the pole rotation.

In addition, the processing technique of rotary cylinder is much more difficult than that of the rotary disc, which increases the production cost of generators. Furthermore, the arrangement of poles inside the rotary cylinder is also difficult and the processing cost is high. Compared with the rotating shaft, the first rotary disc 2 and the second rotary disc 3 have the advantages of small volume, light weight and low processing difficulty and pole arrangement difficulty. Third, in the fixed shaft rotary cylinder mechanism, the weight of the iron cores, the poles and the rotary cylinder is borne by the fixed shaft, thus intensity requirement for the fixed shaft is very high and the production cost of generator is increased. However, the service life of generator with the fixed shaft rotary cylinder structure is much shorter than that of the generator with the iron core bracket 1, the first rotary disc 2 and the second rotary disc 3. Therefore, for the generator with fixed shaft rotary cylinder structure, the processing is difficult, the industrialization can hardly be realized, and the generator of relatively large volume with actual electricity generation function cannot be produced. The direct rotation-inducing generator of the invention can solve such problems and have large volume.

The processing and production of the direct rotation-inducing generator can be divided into two schemes, namely, the magnet rotation and the iron core rotation.

The Scheme of Magnet Rotation

The first rotary disc 2 and the second rotary disc 3 are fixedly connected with the rotating shaft 4, which is connected to power device such as generator or hydraulic motor. A blade is arranged on the rotating shaft 4 so as to utilize wind power or water power to rotate the rotating shaft 4. When the generator is working, the iron core bracket 1 is fixed, and the rotating shaft 4 drives the first rotary disc 2 and the second rotary disc 3 to rotate against the first iron core 5, thus realizing the simultaneous rotation of the first magnet 8 and the fourth magnet 11 against the first iron core 5.

During the rotation process, the change of the magnetic flux on the surface of the first iron core 5 is as follows: when the first magnet 8 and the fourth magnet 11 rotate to the position collinear with the first iron core 5, the magnetic flux of the first iron core 5 is biggest. As the first magnet 8 and the fourth magnet 11 continue to rotate, the magnetic flux of the first iron core 5 gradually reduces to zero. When the first magnet 8 and the fourth magnet 11 re-rotate to the first iron core 5, the magnetic flux of the first iron core 5 re-increases from zero to the maximum. By repeating changing the magnetic flux, induced electromotive force can thus be produced in the first coil 14 arranged on the first iron core 5.

The Scheme of Iron Core Rotation

The first iron core 5 is fixedly connected with the rotating shaft 4 through the iron core bracket 1. The iron core bracket 1 and the iron core arranged thereon can, driven by the rotating shaft 4, rotate against the first rotary disc 2 and the rotary disc 3. The change of magnetic flux and the generation principle are the same with that of the scheme of magnetic rotation.

As shown in FIG. 2 to FIG. 4, the second iron core 6 and the third iron core 7 can additionally be arranged on the iron core bracket 1. The first iron core 5, the second iron core 6 and the third iron core 7 are equally distributed on the periphery of the rotating shaft 4 and have the same circle center. The second coil is 16 is arranged on the periphery of the second iron core 6, the third coil 15 is arranged on the periphery of the third iron core 7, the second magnetic 9 is arranged on the first rotary disc 2, the second magnet 9 and the first magnet 8 have the same distances to the rotating shaft 4, the second magnet 9 and the first magnet 8 are in 180 degrees, the fifth magnet 12 is arranged on the second rotary disc 3, the fifth magnet 12 and the fourth magnet 11 have the same distances to the rotating shaft 4, the fifth magnet 12 and the fourth magnet 11 are in 180 degrees, and the fifth magnet 12 faces the second magnet 9 by the opposite poles. During the rotation, induced electromotive force can be generated in the first coil 14, the second coil 15 and the third coil 16, forming three-phase electricity. The number of iron cores is the same with phase number of generators, that is, one iron core arranged on the iron core bracket can generate single-phase electricity; two iron cores arranged produce two-phase electricity, four iron cores arranged produce four-phase electricity, and so forth, thus the generators of multiple phases can be produced to meet the demand of different users.

As shown from FIG. 2 to FIG. 4, in order to strengthen the generation effect, the surface shapes and the sizes of the first iron core 5, the second iron core 6, the third iron core 7, the first magnet 8, the second, the second magnet 9, the fourth magnet 11 and the fifth magnet 12 are identical. In this way, the change to the magnetic flux on the surface of the first iron core 5 in unit time is the biggest under the condition of identical rotation speed. The opposite poles of the first magnet 8 and the fourth magnet 11 of the generator form a pair of opposite pole, called one-pole or single-pole. The generator can be of two-pole, three-pole or multiple-pole. The generator shown in FIG. 1 has tow poles, one of which are formed by the first magnet 8 and the fourth magnet 11 while the other by the second magnet 9 and the fifth magnet 12. Each pole is formed by two independent magnets, which, on the one hand, reduces processing and production cost, and on the other hand prevents the interactive impact when relative rotation occurs to the iron core and the magnet, thus enabling that the conducting wires at both ends of the coil on the iron core are, when led out, free from the impact of the rotation of the iron core or the magnet.

When the generator is of one-pole, the rotation speed of the rotating shaft is 6000 r/min and the AC frequency is 50 Hz; when the generator is of two-pole, the rotation speed of the rotating shaft is 3000 r/min and the AC frequency is 50 Hz; when the generator is of four-pole, the rotation speed of the rotating shaft is 1500 r/min and the AC frequency is 50 Hz.

In order to enable the generator as shown from FIG. 1 to FIG. 4 to generate three-phase sinusoidal alternative current to integrate into the grid for sue, the pole directions of the first magnet 8 and the second magnet 9 are opposite, that is, the directions of the magnetic force lines of the two poles are opposite. If the full-wave current is in demand, the pole directions of the first magnet 8 and the second magnet 9 are identical, that is, the directions of the magnetic force lines of the two poles are identical.

As the magnet always has attraction on the iron core, a plurality of external magnetic blocks 17 are arranged on the first rotary disc 2, as shown in FIG. 1 and FIG. 3, to prevent deformation of the first rotary disc 2 under external force for long and prolong the service life of the generator. The external magnetic blocks 17 are equally distributed on the circle taking the rotating shaft 4 as the circle center. A plurality of internal magnetic blocks 18 are arranged on the iron core bracket 1 and equally distributed on the circle taking the rotating shaft 4 as the circle center. The vertical distance between the external magnetic blocks 17 and the rotating shaft 4 is the same with that between the internal magnetic blocks 18 and the rotating shaft 4. The external magnetic blocks 17 and the internal magnetic blocks 18 as well as the poles are corresponding respectively, with the same poles face with each other.

As the magnet always has attraction on the iron core, a plurality of external magnetic blocks 17 are arranged on the second rotary disc 3 to prevent deformation of the first rotary disc 2 under external force for long and prolong the service life of the generator. The external magnetic blocks 17 are equally distributed on the circle taking the rotating shaft 4 as the circle center. A plurality of internal magnetic blocks 18 are arranged on the iron core bracket 3 and equally distributed on the circle taking the rotating shaft 4 as the circle center. The vertical distance between the external magnetic blocks 17 and the rotating shaft 4 is the same with that between the internal magnetic blocks 18 and the rotating shaft 4. The external magnetic blocks 17 and the internal magnetic blocks 18 are corresponding respectively, with the same poles face with each other.

The repulsive force between the internal magnetic blocks 17 and the internal magnetic blocks can balance the attraction of the pole to the iron core as well as reduce the rotation resistance during the rotation process of the generator to support the rotation.

In order to ensure the sealing effect on the liquid storage tank 19 by the first sealing plate 22 and the second sealing plate 23 and reduce the friction resistance, as shown in FIG. 3 and FIG. 4, the second sealing plate can be in a circle structure. The first sealing plate can also be a circle structure. The first sealing plate 22 and the second sealing plate 23 can be integrated into a whole respectively with the first rotary dist 2 and the second rotary disc 3.

The bearing 21, which can be a magnetic suspension bearing, can be arranged between the rotating shaft 4 and the iron core bracket 1 to reduce the friction.

All the unaccomplished technical contents of the invention are widely-known technologies.

What is claimed is:

1. The direct rotation-inducing generator comprising:
    an iron core bracket (1) and a rotating shaft (4) arranged on the iron core bracket (1);
    a first rotary disc (2) and a second rotary disc (3) are arranged on both ends of the rotating shaft (4);
    a first iron core (5) is arranged on the iron core bracket (1), and a first coil (14) is arranged on the periphery of the first iron core (5);
    a first sealing plate (22) is arranged on the first rotary disc (2), a first magnet (8) is arranged on the first rotary disc (2) or the first sealing plate (22), and the first magnet (8) and the first sealing plate (22) share a same surface;
    a fourth magnet (11) is arranged on the second rotary disc (3), the first magnet (8) and the fourth magnet (11) correspond to the two ends of the first iron core (5), and the first magnet (8) faces the fourth magnet (11) by the opposite poles;
    a liquid storage tank (19) which is filled with magnetic solutions (20) is arranged on an end of the first iron core (5), and the end filled with magnetic liquid in the first iron core (5) contacts with the first sealing plate (22).

2. The direct rotation-inducing generator of claim 1, wherein a second iron core (6) and a third iron core (7) are arranged on the iron core bracket (1); the first iron core (5), the second iron core (6) and the third iron core (7) are equally distributed on a periphery of the rotating shaft (4);
    the first iron core (5), the second iron core (6) and the third iron core (7) share a same circle center; A second coil (16) is arranged on a periphery of the second iron core (6) and a third coil (15) is arranged on the periphery of the third iron core (7); a second magnet (9) is arranged on the first rotary disc (2) and has the same distance with the first magnet (8) as with the rotating shaft (4); the second magnet (9) and the first magnet (8) are in an angle of 180 degrees; a fifth magnet (12) is arranged on the second rotary disc (3) and has the same distance with the fourth magnet (11) as with the rotating shaft (4); the fifth magnet (12) and the fourth magnet (11) are in an angle of 180 degrees; the fifth magnet (12) faces the second magnet (9) by opposite poles; the surface of the fifth magnet (12) and a second sealing plate (23) share a same surface, and the surface of the second magnet (9) and the first sealing plate (22) also share a same surface.

3. The direct rotation-inducing generator of claim 2, wherein shapes and sizes of the end surfaces of the first iron core (5), the second iron core (6), the third iron core (7), the first magnet (8), the second magnet (9), the fourth magnet (11) and fifth magnet (12) are identical.

4. The direct rotation-inducing generator of claim 2, wherein pole direction of the first magnet (8) and that of the second magnet (9) are opposite.

5. The direct rotation-inducing generator of claim 2, wherein pole direction of the first magnet (8) and that of the second magnet (9) are identical.

6. The direct rotation-inducing generator of claim 1, wherein a plurality of external magnetic blocks (17) are arranged on the first rotary disc (2) and equally distributed on a periphery taking the rotary shaft (4) as the circle center; a plurality of internal magnetic blocks (18) are arranged on the iron core bracket (4) and equally distributed on a periphery taking the rotary shaft (4) as the circle center; a vertical distance between the external magnetic blocks (17) and the rotary shaft (4) is the same as that between the internal magnetic blocks (18) and the rotary shaft (4); the internal magnetic blocks (18) correspond with the external magnetic blocks (18) respectively, and poles which face each other have same polarity.

7. The direct rotation-inducing generator of claim 1, wherein a plurality of external magnetic blocks (17) are arranged on a second rotary disc (3) and are equally distributed on a periphery taking the rotary shaft (4) as circle center; a plurality of internal magnetic blocks (18) are arranged on the iron core bracket (1) and equally distributed on a periphery taking the rotary shaft (4) as circle center; the vertical distance between the external magnetic blocks (17) and the rotary shaft (4) is the same as that between the internal magnetic blocks (18) and the rotary shaft (4); the internal magnetic blocks (18) correspond with the external magnetic blocks (18) respectively, and poles which face each other have same polarity.

8. The direct rotation-inducing generator of claim 1, wherein the first sealing plate (22) is a ring structure.

9. The direct rotation-inducing generator of claim 1, wherein a liquid storage tank (19) which is filled with magnetic liquid (20) is arranged on both ends of the first iron core (5);
 a second sealing plate (23) is arranged on the second rotary disc (3); The fourth magnet (11) and the second sealing plate (23) share a same surface; two ends of the first iron core (5) respectively contact with the first sealing plate (22) and the second sealing plate (23).

10. The direct rotation-inducing generator of claim 9, wherein the second sealing plate (23) is a ring structure.

* * * * *